US012528759B2

(12) United States Patent
Hegedus et al.

(10) Patent No.: US 12,528,759 B2
(45) Date of Patent: Jan. 20, 2026

(54) CRYSTALLINE FORMS OF BEMPEDOIC ACID

(71) Applicant: SYNTHON B.V., Nijmegen (NL)

(72) Inventors: Michal Hegedus, Blansko (CZ); Raymond Westheim, Nijmegen (NL)

(73) Assignee: Synthon B.V., Nijmegen (NL)

( * ) Notice: Subject to any disclaimer, the term of this patent is extended or adjusted under 35 U.S.C. 154(b) by 899 days.

(21) Appl. No.: 17/765,956

(22) PCT Filed: Oct. 2, 2020

(86) PCT No.: PCT/EP2020/077645
§ 371 (c)(1),
(2) Date: Apr. 1, 2022

(87) PCT Pub. No.: WO2021/064166
PCT Pub. Date: Apr. 8, 2021

(65) Prior Publication Data
US 2022/0348531 A1 Nov. 3, 2022

(30) Foreign Application Priority Data

Oct. 3, 2019 (EP) .................................... 19201328
Jan. 21, 2020 (EP) .................................... 20152784
May 8, 2020 (EP) .................................... 20173687

(51) Int. Cl.
C07C 51/43 (2006.01)
(52) U.S. Cl.
CPC .......... C07C 51/43 (2013.01); C07B 2200/13 (2013.01)

(58) Field of Classification Search
CPC .... C07C 51/43; C07C 59/245; C07B 2200/13
USPC ......................................................... 562/590
See application file for complete search history.

(56) References Cited

U.S. PATENT DOCUMENTS

2013/0310551 A1* 11/2013 Ross ...................... A61P 31/14
558/179

FOREIGN PATENT DOCUMENTS

WO WO2004067489 8/2004
WO WO-2004067489 A2 * 8/2004 ........... A61K 31/191
WO WO2018218147 11/2018

OTHER PUBLICATIONS

Hunyadi et al., "Crystalline form of 8-hydroxy-2,2, 14, 14-tetramethylpentadecanedioic acid", Jun. 27, 2018, ip.com, pp. 1-8 (Year: 2018).*
Crystalline form of 8-hydroxy-2,2, 14, 14-tetramethylpentadecanedioic acid ED-Darl Kuhn, IP.com, vol. 18, No. 7A, Jun. 27, 2018 pp. 1-9.

* cited by examiner

Primary Examiner — Renee Claytor
Assistant Examiner — Y. Lynnette Kelly-O'Neill
(74) Attorney, Agent, or Firm — Buscher Patent PLLC

(57) ABSTRACT

The presented invention relates to crystalline Form A and Form B of Bempedoic acid, a process for preparation thereof and a composition comprising the Form A or Form B.

12 Claims, 5 Drawing Sheets

CRYSTALLINE FORMS OF BEMPEDOIC ACID

The invention relates to a crystalline forms of Bempedoic acid, compound of formula (1), and to processes for preparation thereof.

BACKGROUND OF THE PRESENT INVENTION

This invention relates to crystalline forms of Bempedoic acid, compound of formula (1) and processes for preparation thereof;

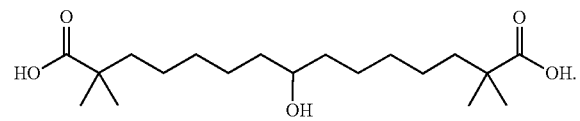
(1)

Bempedoic acid, 8-Hydroxy-2,2,14,14-tetramethylpentadecanedioic acid, is a dual-acting AMP-activated protein kinase (AMPK) activator and ATP citrate lyase (ACL) inhibitor. Bempedoic acid is under regulatory review for the oral treatment of hyper-cholesterolemia.

Bempedoic acid was disclosed in WO 2004067489 application. The process for the preparation disclosed in the application provides Bempedoic acid as a very viscous oil. A solid form of Bempedoic acid is disclosed in WO2018218147 application. The disadvantage of disclosed form is that it is very sticky and exhibits poor flow characteristics that adversely impacts various stages during development of pharmaceutical formulations and drug manufacturing operations such as tablet compressions.

It is therefore advantageous to develop a crystalline form of Bempedoic acid that is not sticky and shows good flow properties and crystallinity.

BRIEF DESCRIPTION OF THE INVENTION

The presented invention relates to crystalline forms Form A or Form B of Bempedoic acid, compound of formula (1), processes for preparation thereof and formulation comprising it;

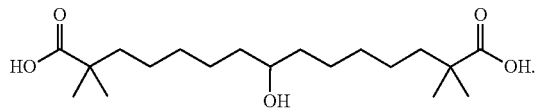
(1)

The presented invention further relates to a pharmaceutical composition comprising the crystalline Form A or Form B of Bempedoic acid.

Crystalline forms of Bempedoic acid of the presented invention are not sticky with improved crystallinity and flowability.

DETAILED DESCRIPTION OF THE INVENTION

The presented invention relates to crystalline forms Form A and Form B of Bempedoic acid, compound of formula (1), a processes for preparation thereof and a formulation comprising it.

The crystalline Form A can be characterized by XRPD pattern having 2θ values 10.3°, 17.5° and 18.0° degrees 2 theta (±0.2 degrees 2 theta). The solid Form A can be also characterized by XRPD pattern having 2θ values 10.3°, 17.5°, 18.0°, 18.7° and 21.8° degrees 2 theta (±0.2 degrees 2 theta). The solid form can be further characterized by XRPD pattern described in the following table:

| Angle 2-Theta ° | Intensity % | Angle 2-Theta ° | Intensity % | Angle 2-Theta ° | Intensity % | Angle 2-Theta ° | Intensity % |
| --- | --- | --- | --- | --- | --- | --- | --- |
| 5.2 | 4.3 | 17.3 | 35.0 | 23.6 | 23.3 | 29.2 | 8.1 |
| 9.9 | 3.1 | 17.5 | 88.4 | 23.9 | 10.9 | 29.9 | 5.3 |
| 10.3 | 63.5 | 18.0 | 100.0 | 24.5 | 3.5 | 30.2 | 3.2 |
| 11.7 | 9.8 | 18.7 | 45.6 | 24.7 | 5.6 | 30.6 | 5.4 |
| 13.1 | 1.7 | 19.6 | 30.9 | 25.2 | 4.5 | 30.9 | 9.3 |
| 13.7 | 3.9 | 20.4 | 66.8 | 25.8 | 4.0 | 31.3 | 3.9 |
| 14.1 | 3.4 | 20.8 | 15.9 | 26.4 | 6.0 | 31.8 | 5.6 |
| 14.5 | 4.7 | 21.1 | 7.7 | 27.0 | 1.9 | 32.5 | 3.6 |
| 15.1 | 3.4 | 21.8 | 41.7 | 27.7 | 10.7 | 32.9 | 3.9 |
| 15.6 | 17.8 | 22.6 | 24.0 | 28.4 | 1.9 | 34.5 | 8.0 |
| 17.1 | 11.8 | 23.2 | 19.9 | 28.6 | 2.3 | | |

Figure 1:
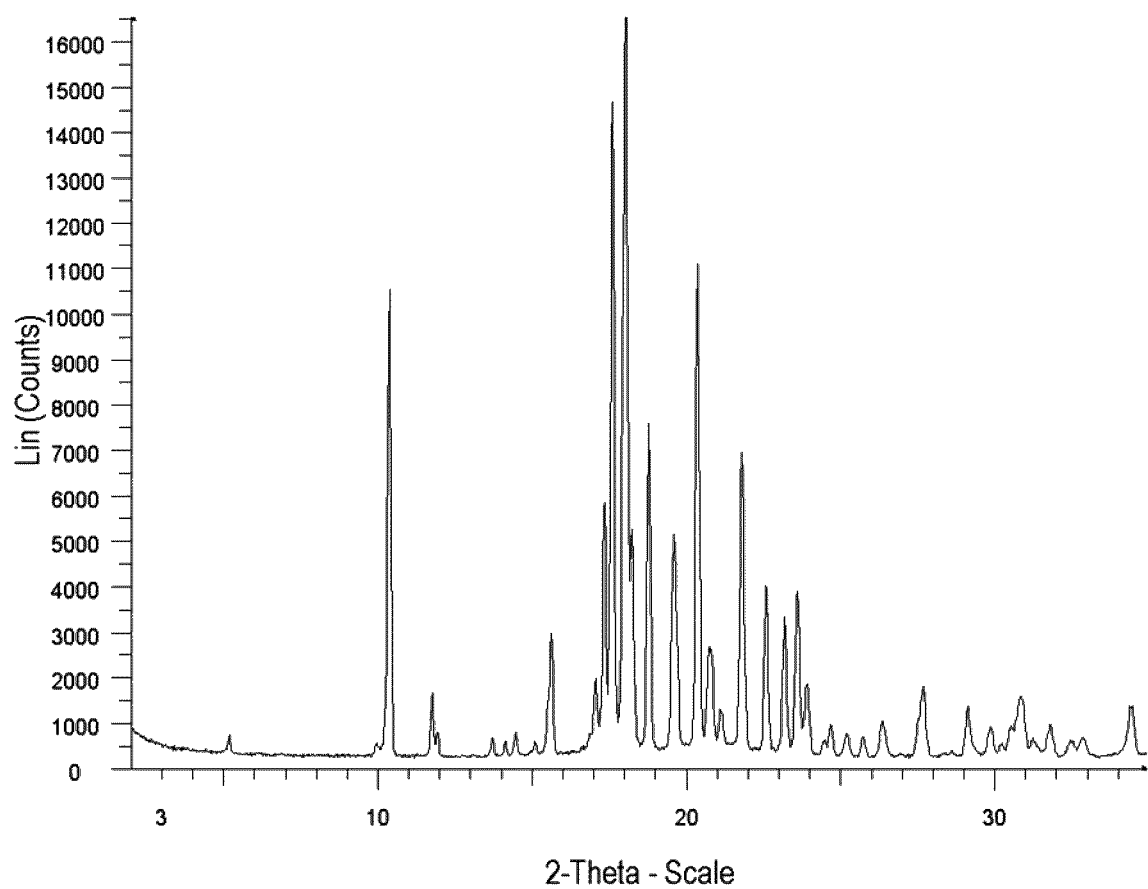
FIG. 1 depicts the X-Ray Powder Diffractogram (XRPD) of crystalline form of Bempedoic acid, Form A, prepared according to Example 1 to 23.
Figure 2:
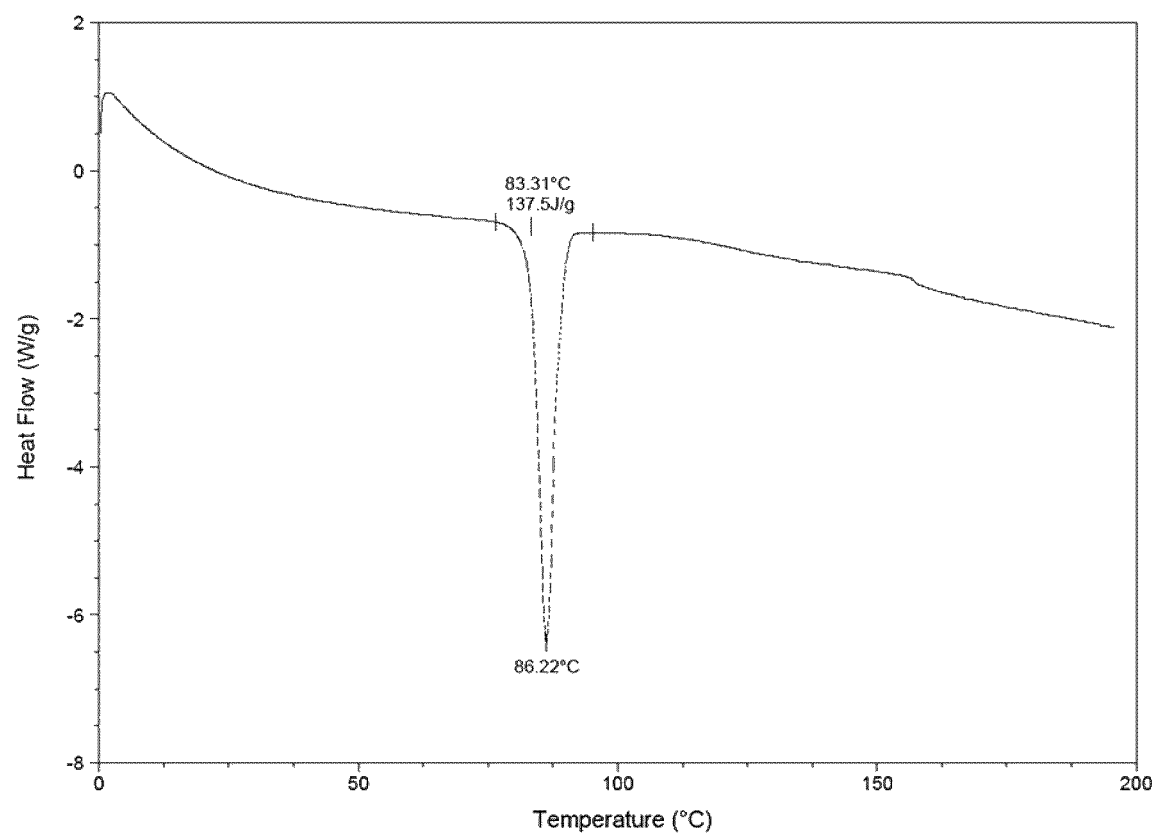
FIG. 2 depicts the DSC pattern of crystalline form of Bempedoic acid, Form A, prepared according to Example 1 to 23.

The crystalline Form A can be also characterized by XRPD pattern depicted in FIG. 1 or DSC pattern depicted in FIG. 2.

The solid Form A can be prepared by a process comprising:
  a. Dissolving of compound of formula (1) in an organic solvent to obtain a solution;
  b. Isolating the solid form.

The organic solvent in step a. can be selected from $C_1$-$C_6$ alcohol (for example methanol or ethanol or propanol or 2-propanol or isopropanol or butanol or 2-butanol or pentanol or 2-pentanol or hexanol) or acetone or an acetate (for example methyl acetate or ethyl acetate or propyl acetate or butyl acetate) or dimethylsulfoxide or tetrahydrofurane or 2-methyl-tetrahydrofurane or acetic acid or a mixture thereof.

Preferably the solvent is selected from methanol or ethanol or acetone or ethyl acetate.

The concentration of compound of formula (1) in the solvent can be:
  1. In case the solvent is selected from C1-C6 alcohol the concentration can be between 250-500 g/L, preferably it is between 200-300 g/L;
  2. In case the solvent is acetone the concentration can be between 100-250 g/L;
  3. In case the solvent is selected from an acetate the concentration can be between 100-250 g/L;
  4. In case the solvent is selected from dimethylsulfoxide or tetrahydrofurane or 2-methyl-tetrahydrofurane or acetic acid the concentration can be between 200-300 g/L.

Bempedoic acid can be dissolved at a temperature between 10° C. and the reflux temperature of used solvent, preferably temperature between 20° C. and 50° C. can be used, more preferably temperature between 20° C. and 30° C. can be used.

Crystalline form A is obtained in step b. by either concentrating the solution, for example using rotavap to for example ⅔ or ½ or ⅓ or ¼ of the original volume or the solution can be evaporated to dryness. Or the solution can be cooled to a temperature between −50° C. and 0° C., preferably between −30° C. and −10° C. and stirred at this temperature for between 15 and 300 minutes. The solution can be also cooled to a temperature between −50° C. and 0° C., preferably between −30° C. and −10° C. and left standing at this temperature without stirring for between 15 and 300 minutes. Or to the solution an antisolvent (i.e. a solvent that poorly dissolves Bempedoic acid), for example an alkane such as pentane or heptane or hexane or octane or cyclohexane or cycloheptane or cyclooctane or an aromatic solvent such as toluene or water can be added. Alternatively, the solution obtained in step a. can be added to the antisolvent. The volume ratio between used solvent and antisolvent can be between 1:4 and 1:20 or between 1:6 and 1:20 or between 1:5 and 1:12 or between 1:8 and 1:12. The solvent/antisolvent mixture is then stirred at a temperature between 0° C. and 30° C. for between 5 minutes and 24 hours. The solvent/antisolvent mixture can be also optionally cooled to a temperature between −50° C. and 0° C., preferably between −30° C. and −10° C. and stirred at this temperature for between 5 minutes and 24 hours. The obtained solid can be isolated by any suitable technique, for example using filtration.

The crystalline Form A of Bempedoic acid can be also prepared by a process comprising:
  a. Mixing the compound of formula (1) with an organic solvent to obtain a mixture;
  b. Heating the mixture to dissolve the compound of formula (1);
  c. Isolating the solid form.

The organic solvent in step a. can be selected from acetonitrile or toluene or 1,4-dioxane or a chlorinated solvent (such as chloroform of dichloromethane) or a mixture thereof.

The concentration of compound of formula (1) in the solvent can be:
  1. In case the solvent is selected from a chlorinated solvent (such as chloroform of dichloromethane), concentration of compound (1) can be between 100 and 200 g/L;
  2. In case the solvent is toluene, concentration of compound (1) can be between 100 and 200 g/L;
  3. In case the solvent is 1,4-dioxane, concentration of compound (1) can be between 300 and 600 g/L;
  4. In case the solvent is acetonitrile, concentration of compound (1) can be between 50 and 150 g/L.

Bempedoic acid can be dissolved at a temperature between 30° C. and the reflux temperature of used solvent. Crystalline form A can be obtained (step c.) by adding an antisolvent (i.e. a solvent that poorly dissolves Bempedoic acid Form A), for example an alkane such as pentane or heptane or hexane or octane or cyclohexane or cycloheptane or water or a mixture thereof. The volume ratio between used solvent and antisolvent can be between 1:4 and 1:20, preferably between 1:5 and 1:12. The solvent/antisolvent mixture is stirred at a temperature between 0° C. and 30° C. for between 5 minutes and 24 hours. The solvent/antisolvent mixture can be also optionally cooled to a temperature between −50° C. and 0° C., preferably between −30° C. and −10° C. and stirred at this temperature for between 5 minutes and 24 hours.

The solid Form A can be also obtained by a process comprising cooling the solution of Compound of formula (1) in the solvent to a temperature between −50° C. and 30° C., preferably between 0° C. and 20° C. more preferably between 20° C. and 30° C. and stirred at this temperature for between 15 minutes and 24 hours. The solution can be also cooled to a temperature between −50° C. and 20° C., preferably between −30° C. and −10° C. and left standing at this temperature with or without stirring for between 15 and 300 minutes.

The obtained solid can be isolated by any suitable technique, for example using filtration.

The crystalline form A of Bempedoic acid can be also prepared by a process comprising stirring a mixture of compound of formula (1) in water. The concentration of compound of formula (1) can be between 30 and 50 g/L. Compound of formula (1) is mixed with water to form a suspension and the suspension is stirred at a temperature between 0° C. and 40° C., preferably between 20° C. and 30° C. for between 1 and 10 days. The obtained solid can be isolated by any suitable technique, for example using filtration.

Obtained crystalline Form A of Bempedoic acid shows good crystallinity and is not sticky with a good flowability.

The presented invention further relates to hydrate crystalline form, Form B of Bempedoic acid, compound of formula (1), a process for preparation thereof and a formulation comprising it.

The hydrate crystalline form, Form B can be characterized by XRPD pattern having 2θ values 20.2°, 20.6° and 21.6° degrees 2 theta (±0.2 degrees 2 theta). The hydrate crystalline form, Form B can be also characterized by XRPD pattern having 2θ values 20.2°, 20.6°, 21.6°, 27.4° and 27.8° degrees 2 theta (±0.2 degrees 2 theta). The hydrate crystalline form, Form B can be further characterized by XRPD pattern described in the following table:

| Angle 2-Theta ° | Intensity % | Angle 2-Theta ° | Intensity % | Angle 2-Theta ° | Intensity % | Angle 2-Theta ° | Intensity % |
|---|---|---|---|---|---|---|---|
| 5.1 | 10.9 | 17.9 | 100.0 | 23.6 | 18.3 | 29.8 | 5.6 |
| 10.3 | 84.6 | 18.0 | 83.2 | 23.9 | 12.6 | 30.2 | 6.0 |
| 11.8 | 11.5 | 18.8 | 42.8 | 24.6 | 10.4 | 30.5 | 6.1 |
| 13.7 | 7.5 | 19.6 | 30.5 | 25.1 | 6.0 | 31.0 | 8.6 |
| 10.1 | 9.6 | 20.2 | 73.1 | 25.7 | 8.2 | 31.6 | 7.9 |
| 14.4 | 8.0 | 20.6 | 36.0 | 26.3 | 10.6 | 32.5 | 5.6 |
| 15.1 | 8.0 | 20.8 | 17.3 | 26.9 | 4.1 | 32.9 | 4.3 |
| 15.4 | 20.3 | 21.1 | 12.7 | 27.4 | 8.9 | 33.9 | 3.9 |
| 17.0 | 15.1 | 21.6 | 57.7 | 27.8 | 10.0 | 34.4 | 10.8 |
| 17.3 | 40.5 | 22.5 | 32.2 | 28.4 | 3.8 | | |
| 17.6 | 78.3 | 23.2 | 19.3 | 29.1 | 8.8 | | |

Figure 3:
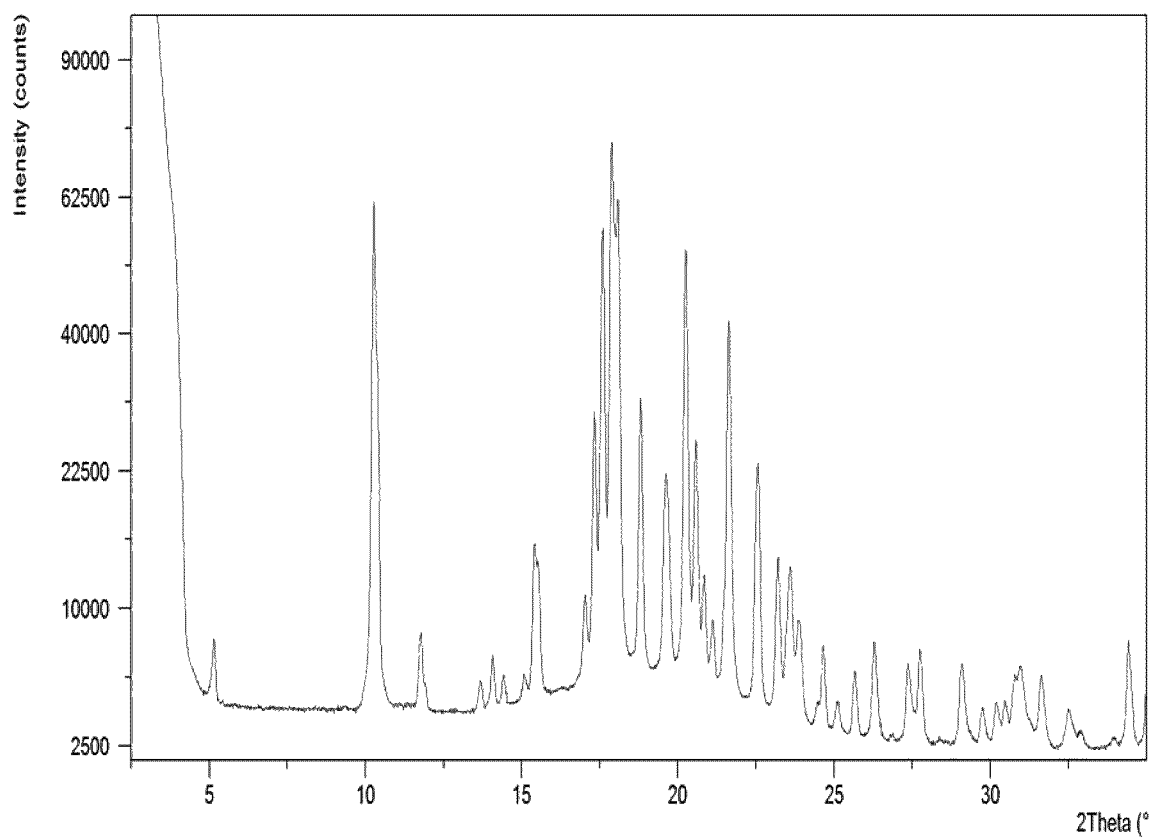
FIG. 3 depicts the X-Ray Powder Diffractogram (XRPD) of hydrate crystalline form of Bempedoic acid, Form B, prepared according to Example 24.
Figure 4:
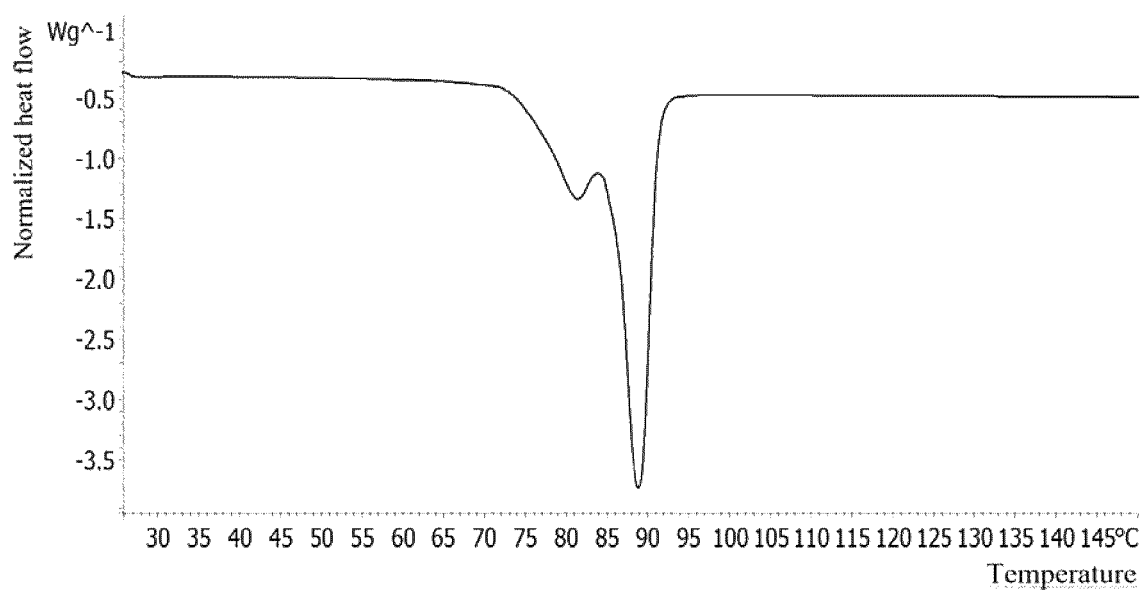
FIG. 4 depicts the Differential Scanning calorimetry (DSC) pattern of hydrate crystalline form of Bempedoic acid, Form B, prepared according to Example 24.
Figure 5:
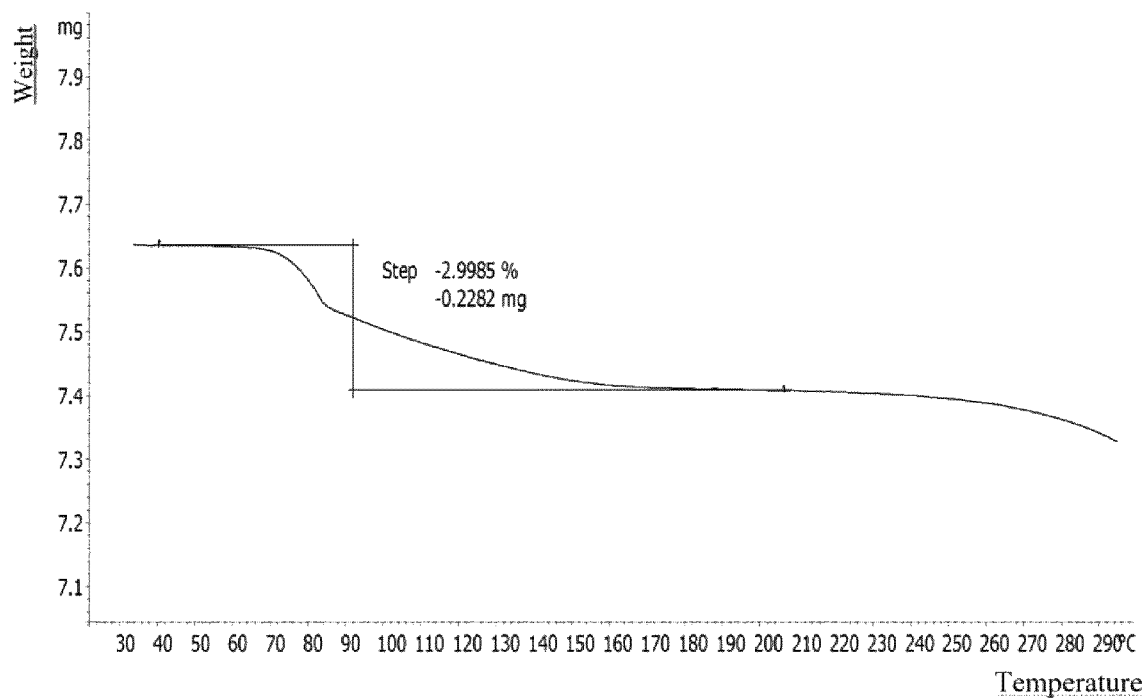
FIG. 5 depicts the Thermogravimetric (TGA) pattern of hydrate crystalline form of Bempedoic acid, Form B, prepared according to Example 24.

The hydrate crystalline form, Form B can be also characterized by XRPD pattern depicted in FIG. 3. The hydrate crystalline form, Form B can be also characterized by the differential scanning calorimetry (DSC) pattern (heating rate 10° C./min) depicted in FIG. 4. Form B exhibit a first endothermic peak near about 81.33° C. and a second endothermic peak near about 88.83° C. when the DSC is performed at heating rate of 10° C./min. The hydrate crystalline form, Form B can be also characterized by the Thermogravimetric (TGA) pattern (heating rate 10° C./min) depicted in FIG. 5.

The hydrate crystalline form, Form B, has a water content from 0.2 to 0.8 equivalent per 1 equivalent of compound of formula (1), preferably 0.4 to 0.6 equivalent per 1 equivalent of compound of formula (1), more preferably the water content is of 0.5 equivalent per 1 equivalent of compound of formula (1).

Surprisingly, the water content did not change when crystalline Form B was subjected to extreme high level of humidity, i.e. 70-90% relative humidity.

The hydrate crystalline Form B of the present invention is in "substantially pure" crystalline form. The term "substantially pure" as used herein includes reference to crystalline forms of, or greater than, 70%, preferably 80%, more preferably 90%, more preferably 95%, more preferably 97%, more preferably 98%, more preferably 99% polymorphic purity as determined, for example, by X-ray powder diffraction.

The hydrate crystalline form, Form B can be prepared by a process comprising:
a. Dissolving of compound of formula (1) in water to obtain a solution;
b. Isolating the solid form.

In the process for the preparation of the hydrate crystalline form, Form B, Bempedoic acid can be first suspended in water at a temperature between 20° C. to 30° C. and then dissolved in water at a temperature between 80° C. to 130° C., preferably between 100° C. to 120° C. The solution can be cooled to a temperature between 20° C. to 30° C., stirred at a temperature between 20° C. to 30° C. for a period between 1 to 3 hours, preferably between 1 to 2 hours allowing the solid formation. The solid can be isolated using any suitable technique, preferably the solid is isolated by filtration. The solid can be dried using technique known to the skilled person in the art, preferably the solid is dried by air.

The hydrate crystalline form, Form B of Bempedoic acid showed to be stable even when dried in oven (e.g. 40° C.) and it does not absorb or lose water when subjected to extreme conditions (humidity above 70% relative humidity) which is advantageous in particular during storage and distribution.

Moreover, the hydrate crystalline form, Form B of Bempedoic acid shows good solubility, crystallinity and a good flowability.

The crystalline Form A or Form B of Bempedoic acid can be processed into a suitable pharmaceutical formulation. In the pharmaceutical formulation the solid forms can be mixed with pharmaceutically acceptable adjuvants, diluents or carriers. The amount of crystalline Form A or Form B in the formulation depends on the condition and a patient to be treated. The pharmaceutical formulation can be if form of a solid oral formulation, for example a capsule, a pill, a powder or a granule. In the formulation the crystalline Form A or Form B according to presented invention can be mixed with one or more additives such as fillers or extenders or binders or wetting agents or disintegrating agents or absorbents or lubricants or buffering agents. The formulation in a form of a tablet or a dragee or a capsule or a pill or a granule can be coated with a coating or shell such as enteric or other coating. The oral formulation can be in a form of an oral emulsion or a solution or a suspension or a syrup. The formulation can contain suitable additives such as diluent(s) or wetting agent(s) or emulsifying agent(s) or suspending agent(s) or sweetening agent(s) or flavouring agent(s). The examples of suitable additive(s) are known to those skilled in the art.

The suitable pharmaceutical formulation can be in a parenteral form such as an injection or an infusion or an injectable depot or in a liposomal form comprising pharmaceutically acceptable aqueous or non-aqueous solution(s) or dispersion(s) or emulsions. The pharmaceutical formulation can be also in a form of a powder for reconstitution into an injection or infusion. The formulation can further comprise additives such as preservative(s) or wetting agent(s) or emulsifying agent(s) or dispersing agent(s) or antibacterial or antifungal agents. The examples of suitable additive(s) are known to those skilled in the art. The suitable pharmaceutical formulation can be in a form suitable for rectal or vaginal administration further comprising suitable additive(s). The examples of suitable additive(s) are known to those skilled in the art.

The crystalline Form A or Form B or a pharmaceutical formulation comprising the form can be used for the treatment of conditions treatable with Bempedoic acid.

EXAMPLES

Bempedoic acid was prepared according to a process disclosed in WO 2004067489 application.

XRPD spectrum (Examples 1-23) was obtained using the following measurement conditions:

Panalytical Empyrean diffractometer with Θ/2Θ geometry (transmition mode), equipped with a PixCell 3D detector;

|  |  |
|---|---|
| Start angle (2θ): | 2.0° |
| End angle (2θ): | 35.0° |
| Step size: | 0.026° |
| Scan speed: | 0.0955 °/seconds |
| Radiation type: | Cu |
| Radiation wavelengths: | 1.5406Å (Kα1), primary monochromator used |
| Divergence slit: | 1/2° |
| Antiscatter slit: | 1/2° |
| Soller slit: | 0.02 rad |
| Detector slit: | 7.5 mm |
| Rotation speed: | 30 rpm |

XRPD spectrum (Examples 24) was obtained using the following measurement conditions:

Panalytical Empyrean diffractometer with θ-2θ geometry (transmition mode), equipped with a PixCell 3D detector;

|  |  |
|---|---|
| Start angle (2θ): | 2.0° |
| End angle (2θ): | 35.0° |
| Step size: | 0.013° |
| Scan speed: | 0.0095 °/seconds |
| Radiation type: | Cu |
| Radiation wavelengths: | 1.5406Å (Kα) |
| Divergence slit: | 1/2° |
| Antiscatter slit: | 2° |
| Soller slit: | 0.02 rad |
| Detector slit: | 8 mm |

DSC measurement was obtained using a Differential Scanning calorimeter DSC822e with Brooks® Sho-Rate™ R-2-15-AAA as flow rate indicating meters (indicating 65 millimeter). Pure nitrogen as the purge gas was used. The measurement was performed with a reference crucible (aluminum standard 40 μl crucible with pierced lid). The heating rate was of 10° C./min.

The thermogravimetry measurement was carried out with the TGA/SDTA851$^e$ (Mettler Toledo AG) using closed aluminium crucible with pierced lid and also pure nitrogen as a purge gas at a flow rate of 40 mL/min. The sample was heated at 10° C./min to 300° C.

Example 1: Preparation of Crystalline Form A of Bempedoic Acid 100 mg of Bempedoic acid was dissolved in 1 ml of acetone at 25° C. The solvent was evaporated using rotary vacuum evaporator at temperature of 40° C. to obtain crystalline form A of Bempedoic acid in a quantitative yield. XRPD pattern of obtained crystalline form corresponds to the XRPD pattern depicted in FIG. 1.

Example 2: Preparation of Crystalline Form A of Bempedoic Acid 100 mg of Bempedoic acid was dissolved in 1 ml of Ethyl acetate at 50° C. The solvent was evaporated using rotary vacuum evaporator at temperature of 40° C. to obtain crystalline form A of Bempedoic acid in a quantitative yield. XRPD pattern of obtained crystalline form corresponds to the XRPD pattern depicted in FIG. 1.

Example 3: Preparation of Crystalline Form A of Bempedoic Acid 100 mg of Bempedoic acid was dissolved in 0.5 ml of methanol at 25° C. The solvent was evaporated using rotary vacuum evaporator at temperature of 40° C. to obtain crystalline form A of Bempedoic acid in a quantitative yield. XRPD pattern of obtained crystalline form corresponds to the XRPD pattern depicted in FIG. 1.

Example 4: Preparation of Crystalline Form A of Bempedoic Acid 100 mg of Bempedoic acid was dissolved in 1 ml of acetone at 25° C. After dissolution of the solid substance, resulting solution was cooled to −24° C. and left at this temperature for 120 minutes to obtain crystalline form A of Bempedoic acid in 70% yield. XRPD pattern of obtained crystalline form corresponds to the XRPD pattern depicted in FIG. 1.

Example 5: Preparation of Crystalline Form A of Bempedoic Acid 100 mg of Bempedoic acid was dissolved in 1 ml of Ethyl acetate at 50° C. After dissolution of the solid substance, resulting solution was cooled to −24° C. and left at this temperature for 120 minutes to obtain crystalline form A of Bempedoic acid in 70% yield. XRPD pattern of obtained crystalline form corresponds to the XRPD pattern depicted in FIG. 1.

Example 6: Preparation of Crystalline Form A of Bempedoic Acid 100 mg of Bempedoic acid was dissolved in 1 ml of acetone and 10 ml of toluene was added at once at 25° C. upon vigorous stirring. The mixture was stirred for another 10 hours to obtain crystalline solid Form A in 75% yield. XRPD pattern of obtained crystalline form corresponds to the XRPD pattern depicted in FIG. 1.

Example 7: Preparation of Crystalline Form A of Bempedoic Acid 100 mg of Bempedoic acid was dissolved in 1 ml of acetone and 10 ml of n-heptane was added at once at 25° C. upon vigorous stirring. The mixture was stirred for another 10 minutes to obtain crystalline solid Form A in 77% yield. XRPD pattern of obtained crystalline form corresponds to the XRPD pattern depicted in FIG. 1.

Example 8: Preparation of Crystalline form A of Bempedoic Acid 100 mg of Bempedoic acid was dissolved in 1 ml of acetone and 10 ml of cyclohexane was added at once at 25° C. upon vigorous stirring. The mixture was stirred for another 10 minutes to obtain crystalline solid Form A in 77% yield. XRPD pattern of obtained crystalline form corresponds to the XRPD pattern depicted in FIG. 1.

Example 9: Preparation of Crystalline Form A of Bempedoic Acid 0.2 g of Bempedoic acid was dissolved in 1 ml ethanol at 25° C. The solution was dropwise added to 5 ml of water, stirred at 25° C. for 5-10 minutes. Obtained solid was isolated by filtration and air-dried overnight at 25° C. Form A of Bempedoic acid was obtained in yield 90% of the theoretical yield.

XRPD pattern of obtained crystalline form corresponds to the XRPD pattern depicted in FIG. 1.

Example 10: Preparation of Crystalline Form A of Bempedoic Acid 0.2 g of Bempedoic acid was suspended in 1.5 ml toluene at 25° C. The mixture was heated to reflux to obtain a solution. The hot solution was slowly added to cold n-heptane, stirred at 0° C. The mixture was stirred at 25° C. for 0.75-1 hours. The obtained solid was isolated by filtration and dried at 25° C. Form A of Bempedoic acid was obtained in yield 93% of the theoretical yield. XRPD pattern of obtained crystalline form corresponds to the XRPD pattern depicted in FIG. 1.

Example 11: Preparation of Crystalline Form A of Bempedoic Acid 0.2 g of Bempedoic acid was suspended in 5 ml water and stirred at 25° C. for 6 days. The solid was isolated by filtration and dried overnight at 25° C. to obtain crystalline Form A of Bempedoic acid in a quantitative yield. XRPD pattern of obtained crystalline form corresponds to the XRPD pattern depicted in FIG. 1.

Example 12: Preparation of Crystalline Form A of Bempedoic Acid 0.2 g of Bempedoic acid was suspended in 3 ml acetonitrile. The suspension was heated to reflux, during which a clear solution was obtained. Reflux was maintained for about 15 minutes. The solution was cooled to 25° C. The solid was isolated by filtration and dried at 25° C. Form A of Bempedoic acid was obtained in yield 92% of the theoretical yield. XRPD pattern of obtained crystalline form corresponds to the XRPD pattern depicted in FIG. 1.

Example 13: Preparation of Crystalline Form A of Bempedoic Acid 0.2 g of Bempedoic acid was dissolved in 1 ml of dimethylsulfoxide at 25° C. To the solution, 10 ml of water was added at once. The mixture was stirred at 25° C. for 15-20 minutes to obtain solid. The solid was isolated by decantation of the solvent. The solid was washed twice with water and dried at 25° C. overnight. Form A of Bempedoic acid was obtained in quantitative yield. XRPD pattern of obtained crystalline form corresponds to the XRPD pattern depicted in FIG. 1.

Example 14: Preparation of Crystalline form A of Bempedoic Acid 0.57 g of Bempedoic acid was suspended in 1 ml 1,4-dioxane at 25° C. and the mixture was heated to reflux to obtain a solution. Reflux was maintained for 10 minutes. The solution was cooled to 25° C. To the solution, 10 ml of n-heptane was added slowly. The mixture was stirred for about 5 minutes. The solid was isolated by filtration and dried at 25° C. Form A of Bempedoic acid was obtained in yield 92% of the theoretical yield. XRPD pattern of obtained crystalline form corresponds to the XRPD pattern depicted in FIG. 1.

Example 15: Preparation of Crystalline Form A of Bempedoic Acid 0.25 g of Bempedoic acid was dissolved in 1 ml of tetrahydofurane at 25° C. To the solution, 10 ml n-heptane was added slowly, in course of 1 minute. The mixture was stirred for 30 minutes to obtain a suspension. The solid was isolated by filtration and dried at 25° C. Form A of Bempedoic acid was obtained in yield 91% of the theoretical yield. XRPD pattern of obtained crystalline form corresponds to the XRPD pattern depicted in FIG. 1.

Example 16: Preparation of Crystalline Form A of Bempedoic Acid 0.25 g of Bempedoic acid was dissolved in 1 ml of tetrahydofurane at 25° C. The solution was drop-wise added to 10 ml n-heptane and stirred at 0° C. for 1-2 minutes. The solid was isolated by filtration and dried at 25° C. Form A of Bempedoic acid was obtained in yield 90% of the theoretical yield. XRPD pattern of obtained crystalline form corresponds to the XRPD pattern depicted in FIG. 1.

Example 17: Preparation of Crystalline Form A of Bempedoic Acid 0.25 g of Bempedoic acid was suspended in 2 ml chloroform at 25° C. The suspension was heated to reflux, resulting in a solution. The solution was allowed to cool to 25° C. The solution was stirred at 25° C. for about 21 hours to obtain a suspension. The solid was isolated by filtration and dried at 25° C. Form A of Bempedoic acid was obtained in yield 92% of the theoretical yield. XRPD pattern of obtained crystalline form corresponds to the XRPD pattern depicted in FIG. 1.

Example 18: Preparation of Crystalline form A of Bempedoic Acid 0.25 g of Bempedoic acid was dissolved in 2 ml chloroform at reflux. Reflux was maintained for 5-10 minutes. The solution was dropwise added to 10 ml n-heptane, stirred at 0° C. for 15 minutes. The solid was isolated by filtration and dried at 25° C. Form A of Bempedoic acid was obtained in yield 91% of the theoretical yield. XRPD pattern of obtained crystalline form corresponds to the XRPD pattern depicted in FIG. 1.

Example 19: Preparation of Crystalline Form A of Bempedoic Acid 0.2 g of Bempedoic acid was dissolved in 1 ml ethanol at 25° C. The solution was dropwise added to 10 ml cold n-heptane, stirred at 0° C. for 5 minutes. The solution was left unagitated at 25° C. in an open vial, allowing evaporation of the solvents. Within 6 days, the solvent had evaporated leaving solid Form A in quantitative yield. XRPD pattern of obtained crystalline form corresponds to the XRPD pattern depicted in FIG. 1.

Example 20: Preparation of Crystalline Form A of Bempedoic Acid 0.2 g of Bempedoic acid was suspended in 4 ml ethyl acetate. The suspension was heated to reflux to obtain a solution. Reflux was maintained for 15 minutes. The hot solution was slowly added to 10 ml n-heptane, stirred at 0° C. The solid was isolated by filtration and dried at 25° C. Form A of Bempedoic acid was obtained in yield 91% of the theoretical yield. XRPD pattern of obtained crystalline form corresponds to the XRPD pattern depicted in FIG. 1.

Example 21: Preparation of Crystalline Form A of Bempedoic Acid 0.2 g of Bempedoic acid was dissolved in 1 ml ethanol at 25° C. The solution was dropwise added to 5 ml of water, stirred at 25° C. for 20 hours. The solid was isolated by filtration and dried at 25° C. Form A of Bempedoic acid was obtained in yield 93% of the theoretical yield. XRPD pattern of obtained crystalline form corresponds to the XRPD pattern depicted in FIG. 1.

Example 22: Preparation of Crystalline Form A of Bempedoic Acid 0.2 g of Bempedoic acid was dissolved in 2 ml ethanol at 25° C. The solution was dropwise added to 5 ml cold n-heptane, stirred at 0° C. for 10 minutes. The solution was left unagitated at 25° C. in an open vial, allowing evaporation of the solvents. Within 1 week, the solvent had evaporated, leaving the solid Form A in quantitative yield. XRPD pattern of obtained crystalline form corresponds to the XRPD pattern depicted in FIG. 1.

Example 23: Preparation of Crystalline Form A of Bempedoic Acid 0.25 g Bempedoic acid was suspended in 2 ml acetic acid at 25° C. and stirred at this temperature for 60 minutes to obtain a solution. The solution was added slowly to 10 ml n-heptane, stirred at 25° C. for 45 minutes. The solution was left unagitated at air in an open flask, allowing slow evaporation of the solvents. After 2 weeks, the solid Form A was form in quantitative yield. XRPD pattern of obtained crystalline form corresponds to the XRPD pattern depicted in FIG. 1.

Example 24: Preparation of Crystalline Form B of Bempedoic Acid 0.2 g of Bempedoic acid was suspended in 7 ml of demi-water at 25° C. The suspension was heated to reflux. A clear solution was obtained. The solution was allowed to cool slowly to 25° C. (flask kept in oil-bath) and stirred at 25° C. for 1.5 hour allowing the formation of the crystalline form B of Bempedoic acid. The mixture obtained was filtered over a P3-glass filter. Form B of Bempedoic acid was air-dried overnight at 25° C. A white to off white, crystalline solid in a quantitative yield was obtained. XRPD pattern of obtained crystalline form corresponds to the XRPD pattern depicted in FIG. 3. DSC pattern of obtained crystalline form corresponds to the DSC pattern depicted in FIG. 4. The TGA pattern of obtained crystalline form corresponds to the TGA pattern depicted in FIG. 5.

The invention claimed is:

1. A process for the preparation of a crystalline form of a compound of formula (1)

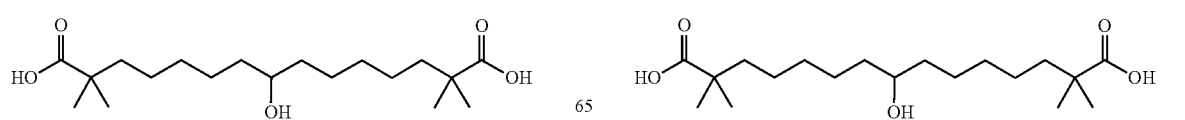

wherein the crystalline form is characterized by an XRPD pattern having 2θ values 10.3°, 17.5° and 18.0° degrees 2 theta (±0.2 degrees 2 theta), which process comprises:
a) dissolving the compound of formula (1) in an organic solvent selected from the group consisting of ethanol, propanol, 2-propanol, isopropanol, butanol, 2-butanol, pentanol, 2-pentanol, hexanol, acetone, an acetate, dimethylsulfoxide, tetrahydrofuran, 2-methyl-tetrahydrofurate, and acetic acid to obtain a solution; and
b) isolating the solid form by cooling the solution or concentration of the solution or addition of an antisolvent.

2. The process according to claim 1 wherein the acetate is selected from the group consisting of methyl acetate, ethyl acetate, propyl acetate, and butyl acetate.

3. The process according to claim 1 wherein the compound of formula (1) is dissolved at a temperature between 10° C. and the reflux temperature of the organic solvent.

4. A process for the preparation of a crystalline form of a compound of formula (1)

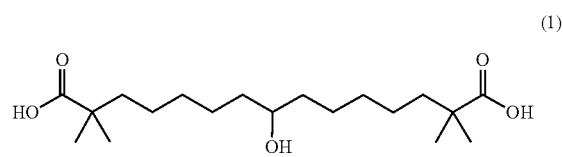 [SMILES: CC(C)(CCCCCC(O)CCCCCC(C)(C)C(=O)O)C(=O)O]

wherein the crystalline form is characterized by an XRPD pattern having 2θ values 10.3°, 17.5° and 18.0° degrees 2 theta (±0.2 degrees 2 theta), which process comprises:
a) mixing of the compound of formula (1) with an organic solvent selected from the group consisting of acetonitrile, toluene, 1,4-dioxane, a chlorinated solvent, and a mixture thereof to obtain a mixture;
b) heating the mixture to dissolve the compound of formula (1) to obtain a solution; and
c) isolating the solid form.

5. The process according to claim 4 wherein the isolating step comprises cooling the solution to a temperature between −50° C. and 0° C.

6. The process according to claim 5 wherein the solution is cooled to a temperature between −30° C. and −10° C.

7. The process according to claim 4 wherein the isolating step comprises concentrating the solution to ⅔ or ½ or ⅓ or ¼ of the original volume or the solution is evaporated to dryness.

8. The process according to claim 4 wherein the isolating step comprises adding an antisolvent selected from an alkane or an aromatic solvent or water.

9. The process according to claim 8 wherein the antisolvent is selected from the group consisting of pentane, heptane, hexane, octane, cyclohexane, cycloheptane, cyclooctane, and toluene.

10. A process for the preparation of a crystalline form of a compound of formula (1)

wherein the crystalline form is characterized by an XRPD pattern having 2θ values 10.3°, 17.5° and 18.0° degrees 2 theta (±0.2 degrees 2 theta), which process comprises: stirring the compound of formula (1) in water.

11. The process according to claim 10 wherein the concentration of compound of formula (1) in water is between 30 and 50 g/L.

12. The process according to claim 10 wherein the stirring is for between 1 to 10 days.

\* \* \* \* \*